United States Patent [19]

Merving

[11] Patent Number: 4,905,410
[45] Date of Patent: Mar. 6, 1990

[54] TREE TREATMENT CAPSULE

[76] Inventor: Hans Merving, Bergius väg 4, S-644 00 Torshälla, Sweden

[21] Appl. No.: 393,841

[22] Filed: Aug. 7, 1989

Related U.S. Application Data

[63] Continuation of Ser. No. 184,072, Apr. 20, 1988, abandoned.

[30] Foreign Application Priority Data

Apr. 24, 1987 [SE] Sweden ............................ 8701680

[51] Int. Cl.⁴ .............................................. A01G 29/00
[52] U.S. Cl. ......................................................... 47/57.5
[58] Field of Search ............................................. 47/57.5

[56] References Cited

U.S. PATENT DOCUMENTS

| | | | |
|---|---|---|---|
| 1,999,458 | 4/1935 | Hollister | 47/57.5 |
| 2,970,348 | 2/1961 | Imus et al. | 47/57.5 |
| 2,970,404 | 2/1961 | Beaufils et al. | 47/57.5 |
| 3,706,161 | 12/1972 | Jenson | 47/57.5 |
| 3,864,874 | 2/1975 | Norris et al. | 47/57.5 |
| 4,308,689 | 1/1982 | Jenson et al. | 47/57.5 |
| 4,342,176 | 8/1982 | Wolfe | 47/57.5 |
| 4,344,250 | 8/1982 | Fahlstrom | 47/57.5 |

FOREIGN PATENT DOCUMENTS

| | | | |
|---|---|---|---|
| 891350 | 3/1944 | France | 47/57.5 |
| 8302998 | 3/1983 | Netherlands | 47/57.5 |

*Primary Examiner*—Robert A. Hafer
*Assistant Examiner*—Charles H. Sam
*Attorney, Agent, or Firm*—Fleit, Jacobson, Cohn, Price, Holman & Stern

[57] ABSTRACT

A tree treatment capsule is disclosed as including a head element having a shank portion with an internal cavity containing a chemical agent, the internal cavity being sealed by a plug in an end of the shank portion remote from the head element; the head element, shank portion, chemical agent and plug forming a self-contained unit which is inserted into a pre-drilled hole in a tree. The shank portion is made of a frangible material so that upon breaking as a result of an impact force applied to the head element, the chemical agent is free to mix with the sap of the tree.

10 Claims, 1 Drawing Sheet

TREE TREATMENT CAPSULE

This application is a continuation of application Ser. No. 07/184,072, filed Apr. 20, 1988, now abandoned.

BACKGROUND OF THE INVENTION

1. Field of the Invention

This invention relates to a tree treatment capsule for feeding a chemical agent into plants and in particular to a capsule for delivering a chemical agent to the phloem layer of a tree. The chemical agent may be either a herbicide or any other tree destroying agent if the treatment is aimed to kill the tree, or a fungicide or any other medicant if the treatment is aimed to cure the tree from a decease or a deficiency.

2. Description of the Prior Art

The prior art of implantation treatment of trees involves either injection of a cartridge into the tree without preparing a pre-drilled hole in the tree, or implantation of a capsule in a pre-drilled hole in the tree. Examples of prior art devices for such treatment are set forth below.

U.S. Pat. No. 3,691,683 discloses a cartridge containing a chemical liquid agent where the cartridge is hammered into a tree so that it fractures upon impact. But the cartridge is only half-way inserted in the tree so that upon fracture much of the liquid agent is wasted on the surface of the tree where it also presents a hazard to the person making the injection.

U.S. Pat. No. 4,308,689 discloses a tree treatment capsule for insertion into a pre-drilled hole in a tree, the capsule being made of a frangible material and containing a liquid agent whereby an impact force applied to an end cap of the capsule causes breaking of the capsule. This known capsule is disadvantageous since it begins to break near the bore opening, thus presenting the risk of exposing the liquid agent outside the bore opening. The end cap of the known capsule also requires a very complicated structural design which renders the capsule expensive to manufacture.

SUMMARY OF THE INVENTION

The present invention is summarized in that a tree treatment capsule is adapted for insertion into a bore of a tree and includes a head element, a shank portion attached to the head element and having an internal cavity, a chemical agent disposed in the cavity, a plug sealingly closing an opening of the shank portion in an end thereof which is remote from the head element, the plug being tapered from a diameter larger than the opening's diameter to a diameter smaller than the opening's diameter, the head element, chemical agent and plug forming a self-contained capsule which is insertable as a unit into the bore in the tree to a position in the bore where the plug abuts a wall of the bore, the shank portion being made of a frangible material whereby an impact force applied to the head element causes the shank portion to move towards the plug such that the plug expands the opening of the shank portion and breaks it to permit the chemical agent to mix with the sap of the tree.

OBJECTS OF THE INVENTION

An object of the present invention is to construct a self-contained tree treatment capsule so as to be simple and economic.

It is a further object of the invention to construct a self-contained tree treatment capsule which contains a chemical treatment agent and which is capable of being broken in the bore without any risk of exposing the chemical agent outside the bore opening.

Other objects and advantages of the present invention will become apparent from the following description taken in conjunction with the accompanying drawing.

DESCRIPTION OF THE PREFERRED EMBODIMENT

Figure 1:
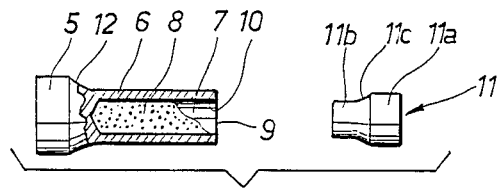
FIG. 1 is an exploded plan view, partly in cross section, of a tree treatment capsule embodying the present invention.
Figure 2:
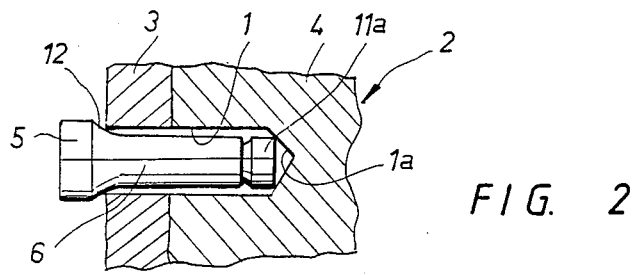
FIG. 2 is a longitudinal plan view of an assembled capsule of FIG. 1 shown in a first stage of insertion in a bore in a tree.

As is illustrated in FIGS. 1 and 2, the present invention is embodied in a tree treatment capsule adapted for insertion into a pre-drilled bore 1 in the trunk of a tree 2 to be treated. As is seen in FIG. 2, the bore 1 is dimensioned to extend through the bark 3 and into the phloem layer 4 of the tree 2. The capsule includes a solid, cylindrical head element 5 having a hollow shank portion 6 rigidly attached thereto, preferably integrally made with the head element 5. The head element 5 has a diameter larger than the bore's 1 diameter whereas the shank portion 6 has a diameter smaller than the bore's 1 diameter.

The shank portion 6 which forms an internal cavity 7 for containing a chemical tree treatment agent 8 has an opened end 9, the opening 10 of which sealingly receives a solid plug 11. The plug 11 has two cylindrical portions 11a and 11b, respectively, the portion 11a having the same diameter as the shank portion 6 whereas the portion 11b has a diameter coinciding with the diameter of the opening 10. The portions 11a and 11b are joined with one another by a tapered transitional portion 11c in order to obtain a tight fit between the portion 11c and the opening 10. The portions 11a, 11b and 11c are preferably made integrally with one another.

The total length of the assembled capsule is preferably slightly larger than the bore's 1 length such that part of the head element 5 will protrude outside the bore's 1 opening when the capsule is fully inserted into the bore 1, as is shown in FIG. 2.

The head element 5 is joined to the shank portion 6 by a tapered, solid transitional portion 12 in order to obtain a tight fit between the portion 12 and the bore's 1 opening. The head element 5, transitional portion 12 and shank portion 6 are preferably made integrally with one another.

The taper of the portions 11c and 12 may be either curved or straight.

All details of the capsule are made of a hard, brittle, breakable and non-elastic material, such as for instance wood or fiber wood, or of brittle, breakable plastic material.

The chemical agent may be of any known kind, for instance a herbicide or a fungicide. According to the invention the chemical agent may be in the form of a tablet or a powder. Alternatively, it may be in a pasty-like or liquid form.

Figure 3:
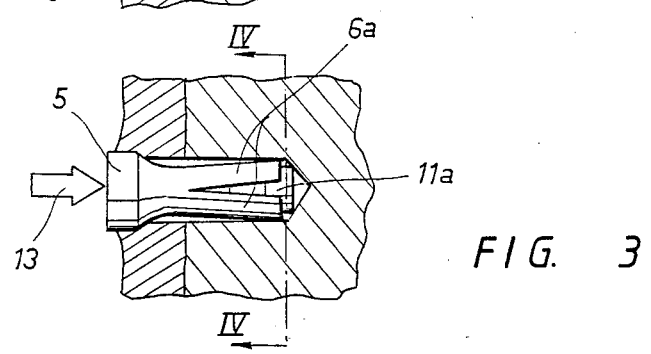
FIG. 3 is a longitudinal plan view of an assembled capsule of FIG. 1 shown in a second stage of insertion in a bore in a tree.
Figure 4:
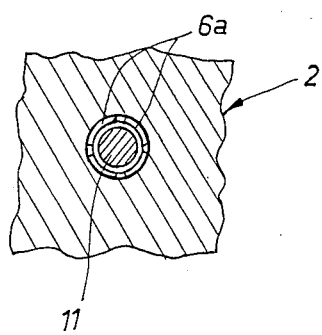
FIG. 4 is a cross sectional view taken along line IV—IV if FIG. 3.

In order to assemble the capsule, the chemical agent 8 is introduced into the cavity 7 and the plug 11 attached to seal the opening 10. The capsule is thereafter inserted into the bore 1 until the plug 11 abuts a wall of the bore 1, for instance its bottom wall 1a, as is shown in FIG. 2. Thereafter an impact force is applied, for instance by hammering, as shown by arrow 13, to the head element 5 causing it and the shank portion 6 to move towards the plug 11 such that the shank portion 6 climbs up along the taper of the plug 11 and such that the plug 11 expands the opening 10 and breaks the shank portion 6 into tongues 6a, as is shown in FIGS. 3 and 4. As FIG. 3 clearly shows, tongues 6a are separated by slits which extend from end 9, which is remote from head element 5, only partially back along the length of shank portion 6 toward head element 5. As also seen in FIG. 3, the slits have a width diminishing along the length of shank portion 6 as the slits extend back toward head element 5 to prevent leakage of chemical agent 8 from bore 1. The slits between tongues 6a form passages to permit the chemical agent 8 to mix with the sap of the tree 2.

Since the diameter of the head element 5 is larger than the bore's 1 diameter a very tight fit will be obtained between the head element 5 and the bore's 1 opening. This will hold the capsule very firmly in the bore 1. The tongues 6a will also exert a pressure against the side walls of the bore 1, thus contributing to retain the capsule firmly in the bore.

What is claimed is:

1. A tree treatment capsule for insertion into a bore in a tree comprising:
   a wooden head element,
   a wooden shank portion integrally formed with said head element and having an internal cavity,
   a chemical agent disposed in said internal cavity,
   said shank portion having an end remote from said head element, said end having an opening for said internal cavity,
   a wooden plug sealingly closing said opening,
   said plug being tapered from a diameter larger than the diameter of said opening to a diameter smaller than the diameter of said opening such that said plug is only partially insertable into said opening in order to obtain a tight fit between said plug and said opening,
   said head element, said shank portion, said chemical agent and said plug forming a self-contained capsule which is insertable as a unit into said bore in the tree to a position in the bore where said plug abuts an end wall of the bore,
   said shank portion being frangible so that as an impact force applied to said head element moves said shank portion towards said plug, said plug expands said opening and breaks said shank portion into a plurality of tongues separated by slits extending from said end remote from said head element only partially back along the length of said shank portion toward said head element and having a width diminishing along the length of the shank portion as the slits extend back toward said head element to prevent leakage of said chemical agent from said bore, said chemical agent thereby allowed to pass from said internal cavity through said slits to mix with sap of the tree.

2. A tree treatment capsule as claimed in claim 1 wherein said shank portion has a diameter smaller than the bore's diameter, and said head element is tapered from a diameter larger than the bore's diameter to a diameter smaller than the bore's diameter to obtain a tight fit between the head element and the opening of the bore.

3. A tree treatment capsule for insertion into a bore in a tree comprising:
   a head element,
   a shank portion integrally formed with said head element and having an internal cavity,
   a chemical agent disposed in said internal cavity,
   said shank portion having an end remote from said head element, said end having an opening for said internal cavity,
   a plug sealingly closing said opening,
   said plug being tapered from a diameter larger than the diameter of said opening to a diameter smaller than the diameter of said opening such that said plug is only partially insertable into said opening in order to obtain a tight fit between said plug and said opening,
   said head element, said shank portion, said chemical agent and said plug forming a self-contained capsule which is insertable as a unit into said bore in the tree to a position in the bore where said plug abuts an end wall of the bore,
   said shank portion being of a frangible material so that as an impact force applied to said head element moves said shank portion towards said plug, said shank portion breaks into a plurality of tongues separated by slits extending from said end remote from said head element only partially back along the length of said shank portion toward said head element and having a width diminishing along the length of the shank portion as the slits extend back toward said head element to prevent leakage of said chemical agent from said bore, said chemical agent thereby allowed to pass from said internal cavity through said slits to mix with sap of the tree.

4. A tree treatment capsule disposed within a bore in a tree comprising:
   a head element,
   a frangible shank portion integrally formed with said head element and having an internal cavity,
   a chemical agent exiting from said internal cavity to mix with sap of said tree,
   said shank portion having an end remote from said head element, said end having an opening for said internal cavity,
   a plug at least partially disposed in said opening, said plug being tapered from a first, large diameter to a second, smaller diameter, said plug being partially received in said opening,
   said head element, said shank portion, said chemical agent and said plug received in the bore in the tree in a position in the bore where said plug abuts an end of the bore and said head element closes said bore to provide a tight fit between said head element and bore to prevent leakage of the chemical agent from the bore,
   said shank portion being broken by said plug upon application of an impact force to said head element so that said opening is expanded and said shank portion is broken into a plurality of tongues to permit said chemical agent to mix with the sap of the tree, said tongues separated by slits, said slits extending from said end remote from said head element only partially back along the length of said shank portion toward said head element and having a width diminishing along the length of the shank portion as the slits extend back towards the head element to prevent leakage of the chemical agent from the bore, said chemical agent passing from said internal cavity through said slits to mix with sap of the tree.

5. A tree treatment capsule as defined by claim 4, wherein said head element, said shank portion and said plug are wooden.

6. A method of treating a tree comprising the steps of:
providing a tree treatment capsule including a head element, a frangible shank portion integrally formed with said head element and having an internal cavity, a chemical agent disposed in said internal cavity, and a plug in an opening of said internal cavity at an end of said shank portion remote from said head element, said plug sealingly closing said opening and retaining said chemical agent in said internal cavity, inserting said tree treatment capsule into a bore formed in said tree so that said plug abuts an end wall of said bore, applying an impact force to said head element to move said head element and said shank portion towards said plug, providing a tight fit between said head element and said bore and expanding said opening as said head element and said shank portion are moved towards said plug, breaking said shank portion into a plurality of tongues separated by slits extending from said end of said shank portion remote from said head element only partially back along the length of said shank portion towards said head element and having a diminishing width along the length of the shank portion as the slits extend back towards said head element, releasing said chemical agent from said internal cavity by permitting said chemical agent to pass from said internal cavity through said slits so that said chemical agent mixes with sap of the tree, and preventing leakage of said chemical agent from said bore by said tight fit and said diminishing width.

7. A method according to claim 6, wherein the shank portion has a smaller diameter than the diameter of the bore so that said chemical agent is released into an annular space defined between the shank portion and the bore.

8. A tree treatment capsule as defined in claim 3, wherein the shank portion has a diameter smaller than the bore to define therewith an annular space into which the chemical agent passes when the shank portion is split.

9. A tree treatment capsule as defined in claim 3, wherein the head element is larger than the bore to seal the bore when the capsule is inserted into the bore.

10. A tree treatment capsule disposed within a bore in a tree as defined in claim 4, wherein the shank portion has a diameter smaller than the bore to define an annular space therebetween.

* * * * *